Oct. 24, 1967  M. H. KRUGER  3,349,238
GLARE-FREE OFFICE LIGHTING DEVICE AND THE LIKE
Filed Dec. 31, 1964  2 Sheets-Sheet 2

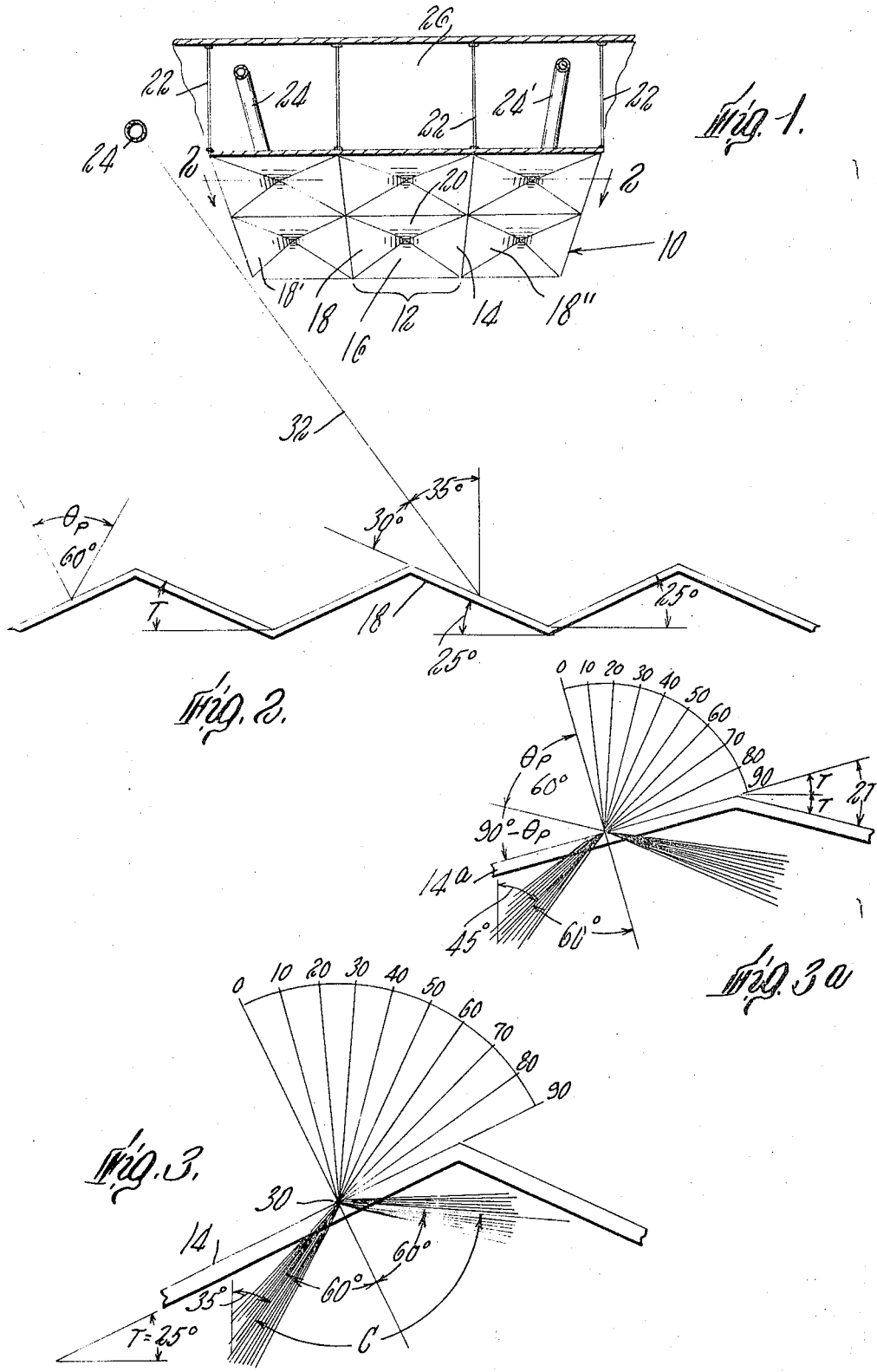

United States Patent Office 3,349,238
Patented Oct. 24, 1967

3,349,238
GLARE-FREE OFFICE LIGHTING DEVICE
AND THE LIKE
Michael Henry Kruger, Chestnut Hill, Mass., assignor to Smithcraft Corporation, Chelsea, Mass., a corporation of Massachusetts
Filed Dec. 31, 1964, Ser. No. 422,751
9 Claims. (Cl. 240—9.5)

ABSTRACT OF THE DISCLOSURE

A light polarizer for ceiling fixtures. Multi-layer reflective-type, transparent, polarizing material sheet are positioned to receive light rays from the light source at angles to the vertical in the range of 25°–45°, and each of the portions is tilted at an angle T to the horizontal, $T = \sphericalangle \Theta_p - \sphericalangle A$, wherein $\sphericalangle \Theta_p$ is Brewster's angle of incidence for the material and $\sphericalangle A$ lies in the range of 25°–45°. The sheet portions are disposed at angles to each other about the vertical, so that light rays in a multiplicity of transverse directions is polarized. Advantageously the polarizing material is heat-formable plastic sheet, and the array is of molded form, adjacent portions being integral with each other.

---

This invention relates to glare-free ceiling lighting fixtures and luminous ceilings for offices and the like.

Glare is one of the greatest problems involved in properly lighting a room. This is apparent to anyone who has tried to read a shiny-papered book with light so striking the paper that it reflects into the reader's eyes from the printing as well as from the unprinted areas. A continuing goal of lighting engineers has been to minimize this glare, regardless of where the readers in an office are situated or in which direction they face.

It has been known for many decades that a light ray that specularly reflects as glare from a surface is polarized in the direction perpendicular to the plane of incidence, that is, there is a preferential reflection of those wave components of the ray in which the electric vector is vibrating perpendicular to the plane of incidence, the plane of incidence being the plane that contains the light ray and the normal to the surface upon which the ray impinges. It has also been known that this glare can be avoided if the original ray is polarized in the opposite direction, the direction parallel to the plane of incidence. Therefore, if light from a ceiling can be properly polarized, glare can be eliminated.

For some time it has been possible to make two kinds of polarizing materials commercially, the multi-layer reflection type and the dichroic type, but ceiling polarizers incorporating these materials have not been fully accepted by the lighting industry.

Among the objects of this invention are to provide means for improved polarized lighting of a room using the multi-layer reflection type of polarizing material and to provide sturdy, simple and inexpensive ceiling polarizer panels that achieve this improvement.

In the drawings:

FIG. 1 is a perspective view of a preferred embodiment of the system of this invention;

FIG. 2 is a cross-section of the embodiment of FIG. 1 taken on lines 2—2 thereof;

FIG. 3 is a partially diagrammatic and partially sectional view of a portion of the embodiment of FIG. 1;

FIG. 3a is a view similar to FIG. 3, the angle of tilt T of the panels being 15°;

Figure 4:
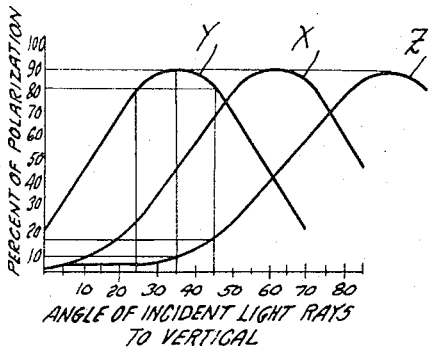
FIG. 4 is a graph illustrating the efficiency of polarization of light passing through a multi-layer polarizer at various angles, and also showing the effects upon the distribution of polarized light that is obtained by the special angular relation of the polarizing material in accordance with this invention, here employing the angle of 25°.

The present improvement employs a simple structure, but the concept that guides it has eluded those skilled in the art. The invention employs a ceiling panel formed of a configured sheet of multi-layer polarizing material that has its various portions specially related to each other and to the vertical. According to the invention a generally radial distribution of properly angled polarized light can be produced so that it does not matter what lateral direction the reader or office worker faces.

One preferred form of an array according to the invention comprises a series of triangular sheet portions of multi-layer material having the characteristic Brewster's angle of 60°. Each triangle has its apex directed upwardly and its plane set at an angle of between 15° and 35° to the horizontal. These triangles are displaced from one another about a vertical axis to define a pyramid and the polarizer comprises a multiplicity of such vertical axis pyramids in a horizontal array. An equivalent array of frusto pyramids or cones can be utilized. The pattern is preferably repeated throughout the area of a luminaire.

These polarizers are advantageously formed by vacuum molding techniques, starting with a softened planar sheet of polarizing material and sucking it into a mold of the proper form.

To explain the invention it is helpful to discuss the function of multi-layer polarizing material. This material comprises a transparent sheet containing a multiplicity of superposed parallel reflecting surfaces, e.g. air-plastic interfaces or plastic-glass flake interfaces, each reflecting surface parallel with the broad surfaces of the sheet. According to Brewster's law there is a given angle of incidence on each layer at which all light that is reflected is polarized in the direction perpendicular to the plane of incidence, the given angle being called the "polarizing" or "Brewster's" angle. This angle is determined by the formula of $$\tan \theta_p = \frac{n'}{n}$$

where $\theta_p$ is Brewster's angle, $n$ is the index of refraction of the material (e.g. air) in which light is traveling before reflection, and $n'$ the index of refraction of the reflecting layer. Multi-layer polarizers do not directly employ this reflected light, but rather employ light that passes into the layer. This residue is polarized in the opposite sense from the reflected light, that is, polarized in the direction parallel to the plane of incidence, in the amount that the reflected light is polarized. For instance, if 15 percent of the incident light on a surface of the polarizer sheet is reflected, and 80 percent of the light that is so reflected is polarized, (12 parts out of 15, it is assumed that the angle of incidence was not precisely equal to Brewster's angle and that the remaining parts vibrate in all directions) then 85 percent of the original incident light continues through the first layer, and 12 out of the 85 parts of this residue beam are polarized. After this residue beam continues, while being diminished by backward reflections through a multiplicity of further layers, the ultimate residue beam is substantially polarized in the plane parallel to the angle of incidence upon the sheet. In presently known polarizing materials the Brewster's angle of incidence is around 60° and as the angle of incidence of the light decreases from the Brewster's angle, the efficiency of the polarizing material drops off drastically so that a large percentage of light transmitted is not polarized.

Referring to FIG. 4, a characteristic curve X of percentage polarization is plotted against the angle to the vertical of light rays that are incident upon a horizontal multi-layer polarizing sheet of a kind that is now produced. With reference to this curve it will be seen that at the Brewster's angle of about 60° the polarizing efficiency is well over 75 percent, but for light that is incident at an angle of 25°, the percentage of polarization has dropped to about 20 percent. Acceptable polarization efficiency occurs in a small range of angles on each side of Brewster's angle. If this polarizing material were placed horizontally, the efficient decrease in glare would occur for light rays making angles with the vertical in the range of 45° to 75°.

Referring now to FIGS. 1 and 2, according to one embodiment of the invention the polarizer 10 comprises four triangular sheet form panels, 14, 16, 18, 20 of multi-layer polarizing material having a characteristic Brewster's angle $\theta_p$ of 60° (see the cross-section of FIG. 2) arranged in to a distinct pattern 12, each panel set at angle T to the horizontal, but each also being set at an angle to the others in such a manner that one of the panels is sloped in each of four directions, forming a four-sided pyramid. The angle T is critically defined by the formula $\angle T = \angle \theta_p - \angle A$ where angle A is selected from the crucial range of 25°–45°. The polarizer comprises a multiplicity of such pyramids in a horizontal array, the pattern being repeated throughout the illuminating device so that panel 18, 18' and 18" form a series of panels sloped in the same direction.

The panels 14, 16, 18, 20 are integral portions molded of a single sheet member, as are successive pyramids in the array, see FIGS. 1 and 2.

The polarizer is suspended by supports 22 and elongated tubular light bulbs 24, 24' are supported above the polarizer 10. A reflux means is provided to reflect and depolarize light that moves upwardly here in the form of a birefringent reflective coating 26 above the bulbs formed, for instance, of magnesium or titanium oxide.

Referring to FIG. 3, arbitrary point 30 on panel 14 receives light as shown diagrammatically. Since the polarizer most efficiently polarizes rays that light which is incident thereupon at an angle of 60°, there is therefore defined a cone C of most efficient polarized light and a volume shown with shading that is highly polarized.

Referring still to FIG. 3, the light that passes through the polarizer 14 downwardly to the left strikes the horizontal working plane at an angle of incidence less from the angle of incidence made with the panel by the amount T the panel is tilted. The angle T here is 25°, the most efficient polarized light is incident upon the working plane at an angle of about 35°, and the range of tolerable polarization incident upon the working plane is at angles between 20° and 50°.

Referring to curve Y in FIG. 4, it will be observed that light incident at 35° upon the working plane is polarized 88 percent, the light incident at critical angles 25° and 45° being polarized equally, about 74 percent, to be compared with 67 percent, 43 percent and 25 percent from curve X for angles 45°, 35° and 25°, respectively, for a horizontal polarizer.

It should be noted that with ordinary ceiling lighting, the rays that produce reader glare are determined by the angles from the vertical at which the viewers look at their work, defined as their "viewing angles." In the usual case where a page is resting upon a horizontal desk surface, the angle the lighting rays make with the page and the angle with which their reflection is viewed are equal because the angle if incidence equals the angle of reflection. If the page is tilted from the desk top so the reader can look at it more squarely without further tilting his head, the troublesome light rays incident upon the page make a smaller angle with the vertical than in the case of the horizontal page. The range of angles to the vertical of 25° to 45° is the crucial range for offices in which readers, e.g. typists, salesmen, etc., are working. The present invention enables light rays in this critical angular range to pass through the polarizer material in a manner that it can be efficiently polarized, and thus glare that is most troublesome can be effectively reduced.

Referring to FIG. 3a, in this embodiment the angle T is 15° and the light in the right hand side of the cone can proceed to the room walls or remote working surfaces. In this embodiment the maximum polarization efficiency occurs at the angle of 45°. In the case of a folded polarizer of the type shown in FIGS. 3 and 3a, in which adjacent panels are set at the same angles to the horizontal in the opposite sense interception of the cone of maximum efficiency polarization by an adjacent panel can be avoided if angle T is made equal to or less than the quantity $$\frac{(90° - \theta_p)}{2}$$

as can be seen from FIG. 3a. For material having a Brewster's angle on the order of 60°, it will be seen that angle T of 15° is the most favorable, considering both the desire to use the entire cone of polarized light as well as to increase polarization in the crucial viewing angle range.

Referring to FIG. 2, some light rays 32 in the range of crucial viewing angles, such as rays that are reflected from surface 26, strike the polarizing panels at angles of incidence to the panel that are decreased by the amount of tilt of the panel rather than increased, as compared to the angle they would strike a horizontal polarizer. The efficiency of polarization of this light is shown by curve Z in FIG. 4. It will be observed that the efficiencies of polarization for this light is not high, being 17 percent, 6 percent and 2 percent, respectively, for angles 45°, 35° and 25°. But if the curves Y and Z are averaged together, the efficiencies of 45.5 percent, 47 percent and 38 percent for the angles 45°, 35° and 25°, respectively, are obtained. This should be compared with the efficiencies achieved with curve X for the horizontal polarizer with efficiencies of 67 percent, 43 percent and 25 percent, for the angles 45°, 35° and 25°, respectively. Despite the fact that for the horizontal polarizer the efficiency at 45° was a somewhat higher percentage, the increase in the average of percentages is in favor of the present invention. But more important, it should be noted the most important angle 25° has gained an advantage of 16 percentage points over the prior art, even when the averages are considered and the polarization is generally uniform over all of the angular range 25°–45°, which comprises an important advance in making the illumination system of general applicability for reading rather than applying to a narrow range of tasks dependent upon large viewing angles.

Figure 5:
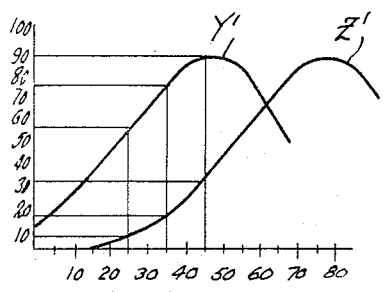
FIG. 5 is a graph similar to FIG. 4 plotting the efficiency of polarization with the portions of the polarizer disposed at an angle of 15° to the horizontal.

Referring to FIG. 5, similar curves Y' and Z' are shown for a panel disposed at an angle T of 15° to the horizontal. Here the average efficiencies are 60.5, 45.5 and 30.5 for the angles 45°, 35° and 25° respectively. Less is lost at the 45° angle, but less is gained for the 25° angle.

Figure 6:
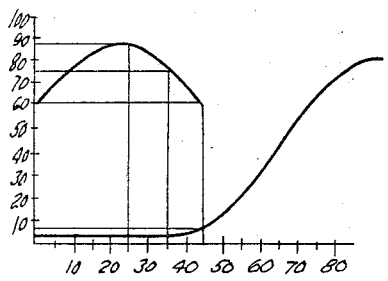
FIG. 6 is a view similar to FIG. 5, the angle of the polarizer to the horizontal being 35°.

Referring to FIG. 6, the angle T is selected at 35°. The average efficiencies are 34 percent, 38 percent and 44 percent for angles 45°, 35° and 25°, respectively. Note the largest percent efficiency is at the very desirable angle of 25°.

Referring back to FIG. 1, it is important to realize that because of the arrangement of the four panels within the pattern 12, that the efficient polarization is not directed in only one direction, but rather is generally radially distributed, there being a multiplicity of four transverse directions to the polarized rays.

Figure 7:
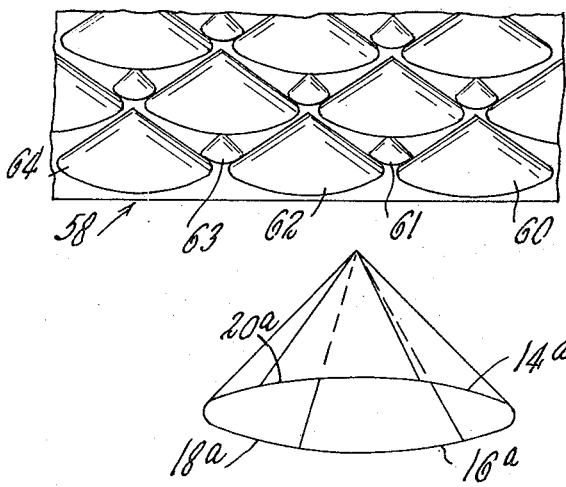
FIG. 7 is a perspective view taken from above of still another polarizer of the invention.
Figure 8:
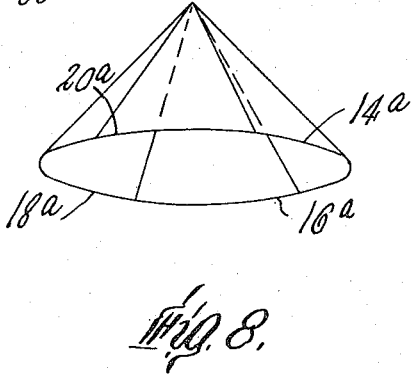
FIG. 8 is a diagrammatic view of one of the cones of the polarizer of FIG. 7.

Referring to the preferred embodiment of FIG. 7, instead of pyramids, the polarizer 58 is defined by a multiplicity of cones arranged in a pattern. Cones 60, 62, and 64 form a line between which are interposed small cones 61, 63, etc. Each of the cones can be likened to a pyramid. Referring to FIG. 8, the conical portion 14a corresponds in effect to the portion 14 of FIG. 1, and similarly cone portions 16a, 18a and 20a correspond in effect to pyrimid sides 16, 18 and 20 of the embodiment of FIG. 1.

While the various kinds of multi-layer polarizing material on the market are all suitable for certain embodiments of the present invention, a particular advantage is obtained with those made of readily heat-formable plastic, e.g. the styrene polarizing material marketed by Polrized Panel Corporation under the name "Polrized Styrene-V(P–10)." This material can be heat formed in a suction mold to the desired form of the embodiments of FIGS. 1 or 7 from a planar sheet of multi-layer polarizing material while preserving substantially the polarizing character thereof. The panel thus formed has substantial self-supporting strength. The glass flake type polarizing material can be formed in segments mounted together, or also heat molded though without the simplicity found with the readily heat-formable plastics.

Various embodiments can be made within the spirit and scope of the invention.

What is claimed is:

1. In a light quality influencing means supported horizontally from a ceiling below a light source to illuminate a room with polarized light, the means including multilayer reflective-type, transparent, polarizing material in sheet form adapted to transmit light polarized in the plane of its incidence, the improvement wherein sheet portions of said polarizing material are positioned to receive light rays from said light source at angles to the vertical in the range of 25°–45°, each of said portions being tilted at an angle T to the horizontal, said angle being defined by the formula $\sphericalangle T = \sphericalangle \theta_p - \sphericalangle A$, wherein $\sphericalangle \theta_p$ is the characteristic Brewster's angle of incidence for said polarizing material and $\sphericalangle A$ is an angle selected from the range of 25°–45°, portions of said material being disposed at angles to each other about the vertical, the light quality influencing means adapted to efficiently polarize at least some light rays in the range of 25°–45° to the vertical in a multiplicity of transverse directions.

2. The light quality influencing means of claim 1 comprising a horizontal array of said tilted portions, selected portions being set at angles to each other about the vertical in a pattern whereby a series of said portions are sloped in each of a multiplicity of lateral directions.

3. The light quality influencing means of claim 2 comprising a horizontal array of flat-sided pyramids having vertical axes, the sides of the pyramids positioned to efficiently polarize downwardly traveling light in the angular range of 25°–45° to the vertical in a multiplicity of directions about said vertical axes.

4. The light quality influencing means of claim 2 comprising a horizontal array of conical shapes having vertical axes, the sides of said conical shapes positioned to efficiently polarize downwardly traveling light in the angular range of 25°–45° to the vertical in radial distributions about said vertical axes.

5. In a light quality influencing means supported horizontally from a ceiling below a light source to illuminate a room with polarized light, the means comprising multilayer reflective-type, transparent, polarizing material in sheet form adapted to transmit light polarized in the plane of its incidence, the improvement wherein portions of said polarizing material are positioned to receive light rays from said light source at angles to the vertical in the range of 25°–45°, each of said portions being tilted at an angle T to the horizontal, said angle being defined by the formula $\sphericalangle T = \sphericalangle \theta_p - \sphericalangle A$, wherein $\sphericalangle \theta_p$ is the characteristic Brewster's angle of incidence for said polarizing material and $\sphericalangle A$ is an angle selected from the range of angles 25°–45°, the tilted portions being disposed in a horizontal array, selected portions being set at angles to each other about the vertical in a pattern, a series of said portions being sloped in each of a multiplicity of lateral directions, whereby selected light rays in the angular range of 25°–45° proceeding in a multiplicity of transverse directions can be efficiently polarized, said multi-layer reflective-type, transparent, polarizing material being comprised of heat-formable plastic sheet, said array being of molded form wherein adjacent portions are integral with each other, said form being self-supporting.

6. The light quality influencing means of claim 5 comprising a horizontal array of flat-sided pyramids having vertical axes, the sides of the pyramids positioned to efficiently polarize downwardly traveling light in the range of 25°–45° to the vertical in generally a multiplicity of directions about said vertical axes.

7. The light quality influencing means of claim 5 comprising a horizontal array of conical shapes having vertical axes, the sides of said conical shapes positioned to efficiently polarize downwardly traveling light in the angular range of 25°–45° to the vertical in radial distributions about said vertical axes.

8. In combination, an elongated light bulb supported from the ceiling of a room, means for reflecting and depolarizing light rays moving upwardly, a light quality influencing panel supported below said light bulb, positioned to receive light rays from said light source and reflective surface which make angles with the vertical in the range of 25° to 45°, said panel being formed of a sheet of multi-layer reflective-type, transparent, polarizing material, the surface of said panel being disposed at such an angle to said rays in said 25°–45° range that at least some of said rays have an angle of incidence upon the surface of said panel of 60°, whereby light rays in said 25°–45° range are efficiently polarized, thereby to reduce reading glare.

9. A lighting system adapted to produce a generally radial distribution of polarized light about the vertical, said system comprising, at least in part an elongated light bulb supported from the ceiling of a room, means for reflecting and depolarizing light rays moving upwardly, a light quality influencing means supported below said light bulb, said light influencing means comprising multilayer reflective-type, transparent, polarizing material in sheet form adapted to transmit light polarized in the plane of its incidence, portions of said member being positioned to receive downwardly traveling light rays at angles to the vertical in the range of 25°–45°, each of said portions being tilted at an angle T to the horizontal, said angle being defined by the formula $\sphericalangle T = \sphericalangle \theta_p - \sphericalangle A$, wherein angle $\theta_p$ is the characteristic Brewster's angle of incidence for said polarizing material, and $\sphericalangle A$ is an angle selected from the range of angles 25°–45°, adjacent portions of said sheet-form material being disposed at angles to each other.

References Cited

UNITED STATES PATENTS

| | | | |
|---|---|---|---|
| 1,610,423 | 12/1926 | Cawley | 240—9.5 X |
| 2,887,566 | 5/1959 | Marks | 240—9.5 |
| 3,069,974 | 12/1962 | Marks et al. | |
| 3,222,515 | 12/1965 | Orr | 240—9.5 X |
| 3,294,964 | 12/1966 | Schwartz | 240—106 X |

FOREIGN PATENTS

| | | |
|---|---|---|
| 1,185,050 | 2/1959 | France. |

NORTON ANSHER, *Primary Examiner.*

RICHARD M. SHEER, *Assistant Examiner.*